US008831429B2

(12) United States Patent
Maryfield et al.

(10) Patent No.: US 8,831,429 B2
(45) Date of Patent: Sep. 9, 2014

(54) NEAR FIELD COMBAT IDENTIFICATION (75) Inventors: Tony Maryfield, Poway, CA (US);
Mahyar Dadkhah, San Diego, CA (US);
Steve Blahnik, El Cajon, CA (US)

(73) Assignee: Cubic Corporation, San Diego, CA (US)

( * ) Notice: Subject to any disclaimer, the term of this patent is extended or adjusted under 35 U.S.C. 154(b) by 167 days.

(21) Appl. No.: 13/186,148

(22) Filed: Jul. 19, 2011

(65) Prior Publication Data

US 2012/0189312 A1    Jul. 26, 2012

Related U.S. Application Data (60) Provisional application No. 61/365,540, filed on Jul. 19, 2010.

(51) Int. Cl.
*H04B 10/00* (2013.01)
*H04B 10/114* (2013.01)

(52) U.S. Cl.
CPC ................... *H04B 10/1143* (2013.01)
USPC ............................ 398/118; 398/108; 398/130

(58) Field of Classification Search
USPC ............. 398/108, 107, 109, 88, 82, 169, 170, 398/118–131
See application file for complete search history.

(56) References Cited

U.S. PATENT DOCUMENTS

| 4,143,263 | A | * | 3/1979 | Eichweber | 398/170 |
|---|---|---|---|---|---|
| 5,274,379 | A | * | 12/1993 | Carbonneau et al. | 342/45 |
| 5,819,164 | A | * | 10/1998 | Sun et al. | 455/106 |
| 7,860,408 | B2 | * | 12/2010 | Isomura et al. | 398/212 |
| 2004/0120717 | A1 | * | 6/2004 | Clark et al. | 398/118 |
| 2006/0215147 | A1 | * | 9/2006 | Scott et al. | 356/4.01 |
| 2007/0177880 | A1 | * | 8/2007 | Karasikov et al. | 398/170 |
| 2009/0263138 | A1 | * | 10/2009 | Pelley et al. | 398/131 |

* cited by examiner

*Primary Examiner* — M. R. Sedighian
(74) *Attorney, Agent, or Firm* — Kilpatrick Townsend & Stockton LLP (57) ABSTRACT Systems and methods are provided regarding an optical communication system for both short- and long-range applications employing specialized diffusive elements. An interrogator unit can utilize a diffusive element that diffuses a portion of the laser beam for short-range applications. Other portions of the beam can have low divergence to enable long-range functionality as well. A response unit can utilize a diffusive retroreflector to help ensure sensors coupled to the interrogator unit detect a reflected beam. The interrogator unit can employ a plurality of sensors for sensing one or more response signals at a plurality of angles.

12 Claims, 6 Drawing Sheets

NEAR FIELD COMBAT IDENTIFICATION

CROSS-REFERENCES TO RELATED APPLICATIONS

The present application claims benefit under 35 USC 119 (e) of U.S. Provisional Application No. 61/365,540, filed on Jul. 19, 2010 of which the entire disclosure is incorporated herein by reference for all purposes.

This application expressly incorporates by reference U.S. Pat. No. 7,983,565, filed on Dec. 10, 2008, entitled "Integrated Optical Communication and Range Finding System and Application Thereof," in its entirety for all purposes.

BACKGROUND OF THE INVENTION

Laser-based range finding and data communication systems have been implemented in a variety of different applications. In a military context, for example, military forces have an interest in using such applications to remotely and securely identify a person. This allows for tracking of personnel and reduction of fratricide. Such Identification as Friend or Foe (IFF) systems are known in the art for military aircraft and other weapons systems, and have recently been introduced for the dismounted soldier. See, for instance, U.S. Pat. No. 7,983,565, filed on Dec. 10, 2008, which is incorporated in its entirety for all purposes. Such systems can include laser systems that generate and interrogation signal of optical pulses which are aimed at a remote target. The remote target, if equipped with a response unit, can add identification or other information to the interrogation signal and return the modified interrogation signal as a response signal to the laser system, which processes the response signal to identify the remote target. IFF systems such as these offer a more reliable solution for identification than simple visual assessments of other dismounted soldiers. Because visual assessments are particularly difficult at long ranges, IFF systems are typically adapted for long-range use. Short-range, or near field, functionality of IFF systems and similar optical communication systems, however, is limited.

SUMMARY OF THE INVENTION

An optical communication system for both short-range (i.e., near-field) and long-range applications employing specialized diffusive elements, according to certain embodiments of the present invention. An interrogator unit can utilize a diffusive element that diffuses a portion of the laser beam for short-range applications. Other portions of the beam can have low divergence to enable long-range functionality as well. A response unit can utilize a diffusive retroreflector to help ensure sensors coupled to the interrogator unit detect a reflected beam. The interrogator unit can employ a plurality of sensors for sensing one or more response signals at a plurality of angles.

An example method of free-space optical communication using laser light, according to the disclosure, includes generating a beam of light with a laser at a first location, modulating the beam of light with a first data signal to provide an optical transmission signal, diffusing a first portion of the optical transmission signal with an optical element to cause an increase in beam divergence of the first portion of the optical transmission signal, receiving at least a portion of the optical transmission signal at a second location, reflecting the optical transmission signal to provide a reflected optical transmission signal, modulating the reflected optical transmission signal, diffusing at least a portion of the reflected optical transmission signal to cause an increase in beam divergence of the at least the portion of the reflected optical transmission signal, and providing a plurality of sensors configured to detect the reflected optical transmission signal from one or more of a plurality of angles.

The method of free-space optical communication using laser light can include one or more of the following features in addition. Collimating a second portion of the optical transmission signal with the optical element. The beam divergence of the first portion of the optical transmission signal, after being diffused with the optical element, can be at least 40 milliradians (mrad). The beam divergence of the at least the portion of the reflected optical transmission signal, after being diffused, can be at least 1 mrad. The first portion of the optical transmission signal can comprise 15% or less of the total power of the optical transmission signal. Reflecting the optical transmission signal can include using a plurality of retroreflective features, each of the retroreflective features having a set of three reflective surfaces that are approximately orthogonal to each other. Determining, at the first location, that a signal received from a sensor of the plurality of sensors representing the reflected optical transmission signal is below a threshold level, and increasing power of the beam of light. The plurality of sensors can comprise avalanche photo diodes.

An example free-space optical interrogator, according to the disclosure, can comprise a laser configured to generate a beam of light, a modulation component coupled with the laser and configured to modulate the beam of light with a first data signal to provide an optical transmission signal, and an optical element disposed in a path of the optical transmission signal. A first portion of the optical element can be configured to diffuse a first portion of the optical transmission signal. The free-space optical interrogator also can comprise one or more sensors configured to receive a reflected optical transmission signal, and a demodulation component coupled with the one or more sensors and configured to determine a second data signal from the reflected optical transmission signal.

The free-space optical interrogator also can include one or more of the following features. A second portion of the optical element can be configured to collimate a second portion of the optical transmission signal. The first portion of the optical element can be configured to cause beam divergence of the first portion of the optical transmission signal of at least 40 milliradians (mrad). The optical element can be configured to diffuse 15% or less of the total power of the optical transmission signal. A feedback component can be communicatively coupled with the one or more sensors and configured to increase power of the beam of light if a detection signal representing the reflected optical transmission signal is below a threshold level.

An example free-space optical communication unit, according to the disclosure, can include a retroreflection unit that comprises a first reflective surface, a second reflective surface approximately orthogonal to the first reflective surface, and a third reflective surface approximately orthogonal to the first reflective surface and the second reflective surface. The retroreflection unit can be configured such that laser light reflected by the retroreflection unit has a beam divergence of least 1 mrad. The free-space optical communication unit also can include a modulation component configured to modulate an optical signal reflected by the retroreflection with a data signal.

The free-space optical communication unit also can include one or more of the following features. At least a portion of one or more of the first reflective surface, the second reflective surface, or the third reflective surface can include features configured to diffuse light. A plurality of retroreflection units can be configured to reflect a single beam of light.

BRIEF DESCRIPTION OF THE DRAWINGS

For a more complete understanding of this invention, reference is now made to the following detailed description of the embodiments as illustrated in the accompanying drawing, in which like reference designations represent like features throughout the several views and wherein.

DETAILED DESCRIPTION OF THE INVENTION

The ensuing description provides embodiment(s) only, and is not intended to limit the scope, applicability or configuration of the disclosure. Rather, the ensuing description of the embodiment(s) will provide those skilled in the art with an enabling description for implementing a embodiment. It being understood that various changes may be made in the function and arrangement of elements without departing from the spirit and scope.

The present invention is directed toward systems for enabling optical communication between a plurality of entities for both short- and long-range applications. Typical laser-based optical communication systems are adapted for long-range applications. There are, however, scenarios that require identification of proximate targets. For instance, a dismounted soldier in an urban combat environment may want to use an Identification as Friend or Foe (IFF) system to determine whether any friendly soldiers are in a room before entering the room or opening fire on any targets therein.

Typical laser-based IFF systems are typically designed to support a communication range of a kilometer or greater. In order to achieve communication ranges of this magnitude, the interrogation signal is carried on a laser beam with low beam divergence. At short distances, the spot size of an IFF laser system therefore is extremely small, so the laser would have to be accurately aimed at a target's response unit in order for the response unit to receive the interrogation signal and return a response signal. The time and effort required to perform this aiming at such proximity could imperil the soldier and would defeat the purpose of using the IFF to quickly determine whether there are any identifiable targets in the room.

Figure 1A:
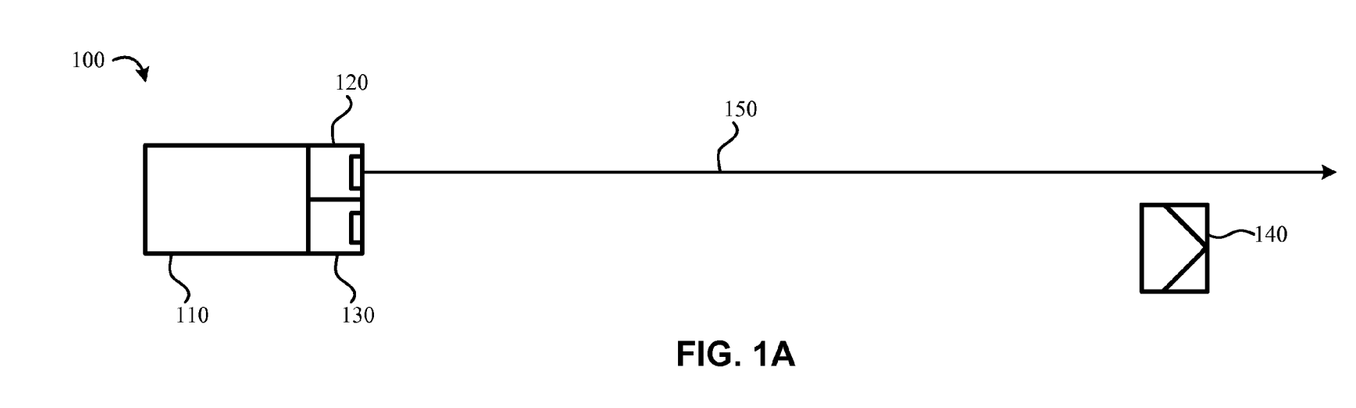
FIG. 1A is simplified diagram of a long-range optical communication system, illustrating a first difficulty in orienting a interrogation unit such that a laser beam illuminates a response unit at short ranges.
Figure 1B:
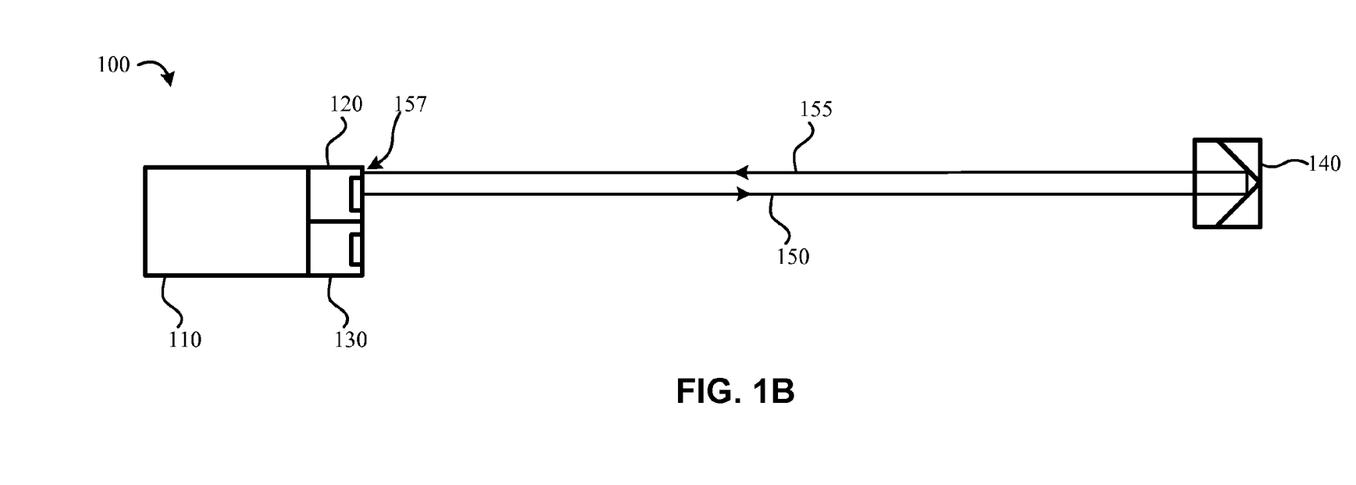
FIG. 1B is simplified diagram of a long-range optical communication system, illustrating a second difficulty of detecting a properly-illuminated response unit short ranges.

FIGS. 1A and 1B are simplified diagrams of an optical communication system 100 that illustrates this problem. An interrogation unit 110 can be mounted to a weapon, tripod, vehicle, etc., and aimed toward a response unit 140. The response unit 140 can be a small device that is worn on the clothes and/or helmet of a soldier, mounted to a vehicle, located on a weapon, etc. Moreover, an interrogation unit 110 may be built as stand alone hand held units, embodied in larger systems, and/or coupled with existing equipment. For example, such a system may be mounted upon the barrel of a rifle or other weapon.

The response unit 140 can include, among other things, a retroreflector coupled with a modulation device such that, when illuminated by a laser beam 150 received by the interrogation unit 110, the response unit 140 can reflect the laser beam back to the interrogation unit 110 while modulating the reflected laser beam 155 to include information on the reflected laser beam. To receive the reflected laser beam, the interrogation unit 110 also can include an optical detector 130, such as an avalanche photo detector (APD) or other photo-detection sensor, as well as other components (e.g., processing units, digital signal processors, and other devices for processing optical signals) that can detect and demodulate the reflected laser beam 155 from the response unit 140.

The interrogation unit 110 can have a laser transmitter 120 that generates a laser beam 150, which can be modulated with a data signal to communicate the data optically via the laser beam 150. Depending on the desired functionality of the system, any type of data can be communicated. For example, it can be text, audio, and/or video, which can be encrypted for security purposes. The data signal can be generated with other components (not shown) of the interrogation unit 110, such as memory, audio and/or video input, processing devices, etc.

In typical operation at long ranges, the interrogation unit 110 generates an interrogation signal in the form of a laser beam 150 that illuminates the response unit 140, which reflect and modulates the laser beam, illuminating the optical detector on the interrogation unit. As indicated above, laser beam 150 in an optical communication system 100 adapted for long-range use typically has very little divergence. In many IFF systems, for example, beam divergence of a laser beam 150 can be 6 milliradians or less. As illustrated in FIG. 1A, a laser beam 150 with such small beam divergence can be extremely difficult for a user to accurately aim a nearby interrogation unit 110 such that the laser beam 150 generated by the laser transmitter 120 illuminates the response unit 140. For example, IFF systems with weapon-mounted interrogation units 110 can be difficult to operate at less than 10 meters.

Even if the interrogation unit 110 is successful at illuminating the response unit 140 at close range, additional issues can arise due to the accuracy of the reflection of the response unit 140. As shown in FIG. 1B, the response unit 140 can create a reflected laser beam 155 that illuminates the laser transmitter 120 or nearby location 157 on the interrogation unit 110 without adequately illuminating the optical detector 130. In this scenario, the interrogation unit 110 cannot determine whether the response unit 140 is successfully illuminated by the laser beam 150, because the reflected laser beam does not adequately illuminate the optical detector 130.

Figure 2A:
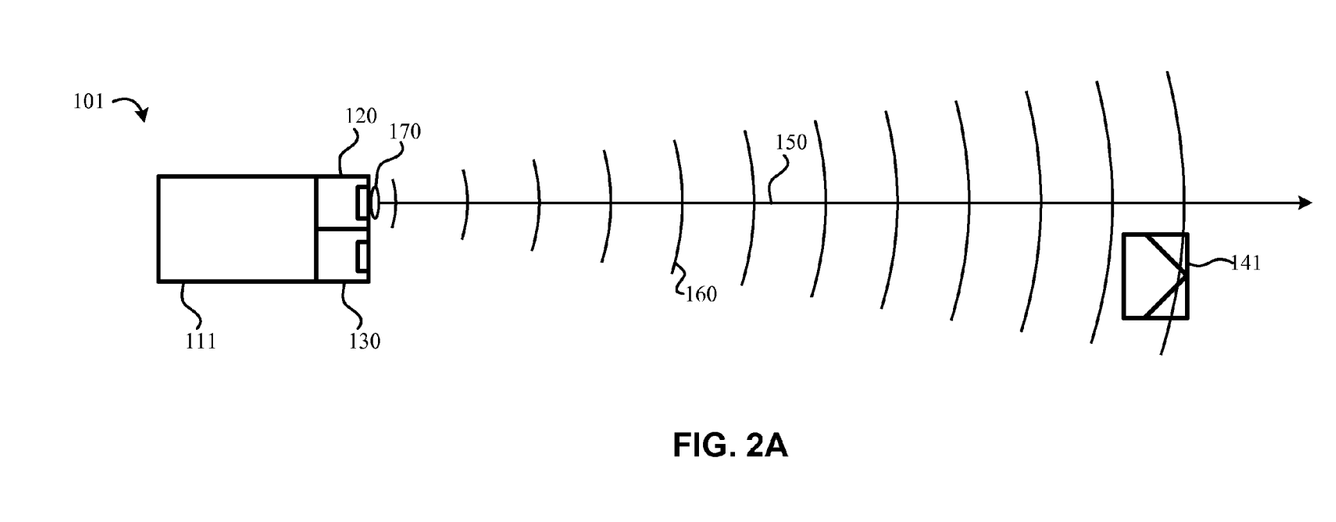
FIG. 2A is simplified diagram of a modified optical communication system, illustrating the partial diffusion of a laser beam to illuminate a modified response unit at a short range.
Figure 2B:
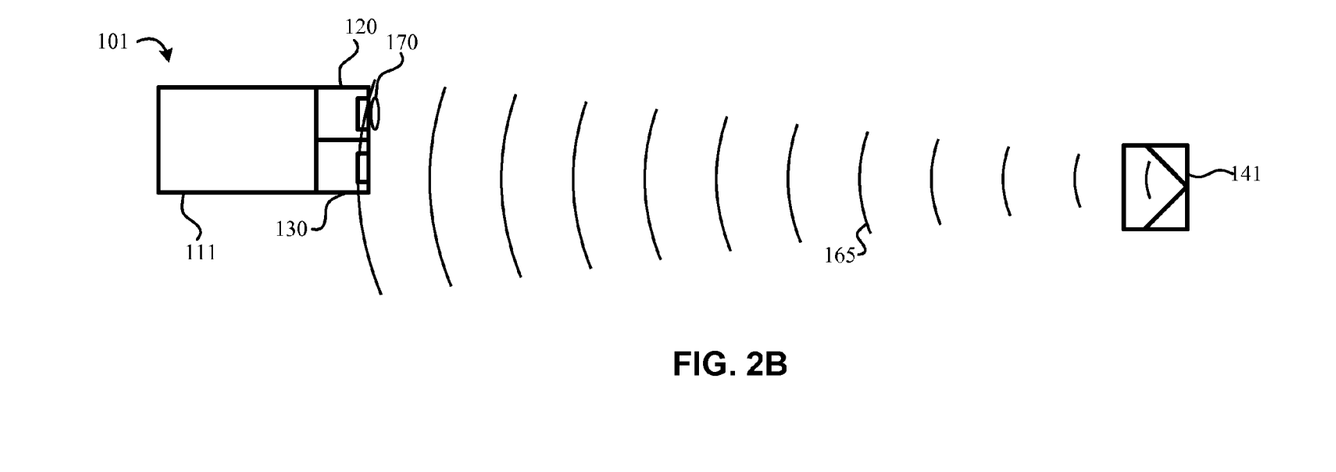
FIG. 2B is simplified diagram of a modified optical communication system, illustrating the diffusion of a reflected laser beam to illuminate an optical detector of the modified interrogation unit at a short range.

FIGS. 2A and 2B are simplified diagrams of a modified optical communication system 101 configured to provide functional short-range reflection and detection of optical signals. Similar to the optical communication system 100 illustrated in FIGS. 1A and 1B, the modified optical communication system 101 illustrated in FIGS. 2A and 2B includes an modified interrogation unit 111 and a modified response unit 141. These modified units diffuse at least a portion of the laser beam 150 to provide sufficient beam divergence for short-range functionality.

In the case of the modified interrogation unit 111, a diffusive optical element 170 can be used that diffuses at least a portion of the laser beam 150 generated by the laser transmitter 120, creating a diffused beam of light 160 with much wider beam divergence. Because the diffused beam of light 160 has a much wider beam divergence, the likelihood of illumination of the modified response unit 141 at shorter ranges substantially increases.

For its part, the modified response unit 141 also can include features to diffuse light. As illustrated in FIG. 2B, light (not shown) that enters the modified response unit 141 can be diffused using any of various techniques described herein. The diffused beam of reflected light 165, having a relatively large beam divergence, is then able more easily illuminate an optical detector 130 of the modified interrogation unit 111.

Depending on desired functionality, the beam divergence diffused beam of light 160 can be large enough to illuminate a modified response unit 141 that is outside range of angles in which the optical detector 130 of the modified interrogation unit 111 can detect response signals. In this case, one or more additional optical detectors 130 can be utilized so that the modified interrogation unit 111 is able to communicate with one or more modified response units 141 at a wide variety of angles.

The present invention contemplates different embodiments for a variety of applications. According to certain embodiments, communication capabilities of the modified optical communication system 101 for the undiffused laser beam 150 can exceed 1 kilometer, while the communication capabilities of the system for the diffused beam of light 160 can reach 30 meters or more. According to other embodiments, the diffusion of signals enables the communication system to operate at ranges of as little as one meter or less to distances of 10 meters or more. Such ranges are provided only as examples and are not intended to limit the scope, applicability, or configuration of the disclosure.

Modified interrogation unit 111 further can employ feedback to optimize communication between the modified interrogation unit 111 and modified response unit 141. For example, the modified interrogation unit 111 can cause the laser transmitter 120 to increase the power of the laser beam 150 (and diffused beam of light 160) when a reflected signal detected by an optical detector 130 is below a certain threshold level. Conversely, the modified interrogation unit 111 can cause the laser transmitter 120 to decrease the power of the laser beam 150 (and diffused beam of light 160) when a reflected signal detected by an optical detector 130 is above a certain threshold level. Such adjustments can be iterative, and the amount of adjusting can vary, depending on desired functionality. For example, for an IFF system where only a relatively small amount of information is exchanged over a short amount of time, the amount of feedback and power adjusting can be minimal. In applications where throughput and reliability have greater priority, more time can be spent during the power-adjusting process.

Figure 3A:
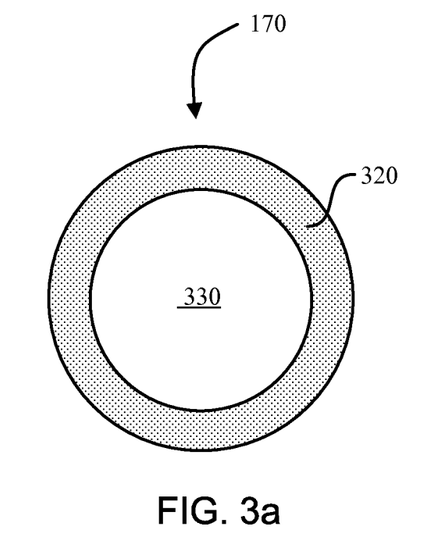
FIGS. 3a and 3b are diagrams of a diffusive optical element used in a modified interrogation unit, according to one embodiment of the present invention.
Figure 3B:
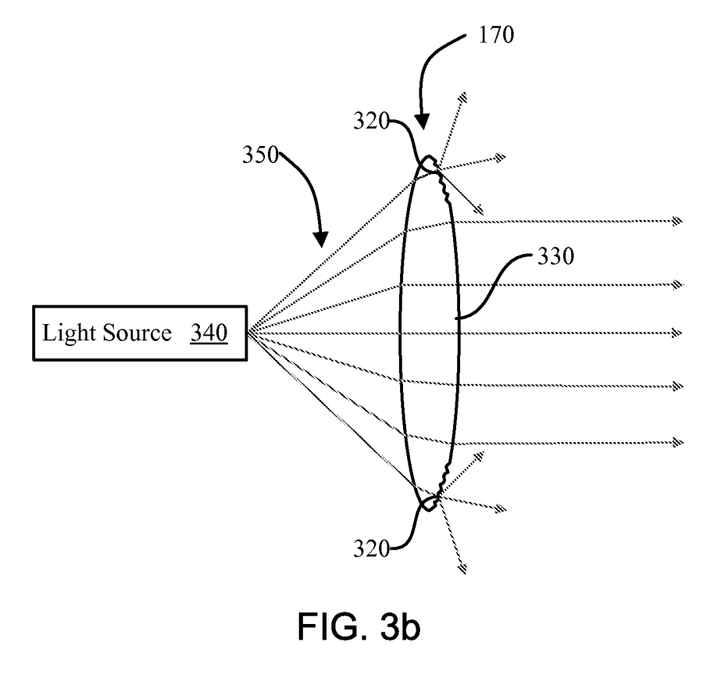

FIGS. 3A and 3B illustrate a diffusive optical element 170, according to an embodiment of the present invention. FIGS. 3A and 3B are included for illustrative purposes only, and the features shown therein are not drawn to scale. FIG. 3A shows a front view of the diffusive optical element 170, which can comprise a lens with a diffusive portion 320, comprising a diffusive annulus, and a collimating portion 330.

FIG. 3B illustrates a side view of the lens. As illustrated, the diffusive optical element 170 can be configured to receive light 350 from a light source 340, such as a laser, and alter the path of the light 350 using both the collimating portion 330 and diffusive portions 320 of the diffusive optical element 170. The diffusive portions 320 of the diffusive optical element 170 causes the modified interrogation unit 111 to act as an isotropic radiator, radiating the diffused light at a wide range of angles for short-range applications. The undiffused portion of the laser beam is collimated for long-range applications. According to some embodiments, diffusive optical element 170 may be employed at or near the exit aperture of a modified interrogation unit 111.

The diffusive optical element 170 may be made of any of a variety of materials (glass, resin plastics, polyester, polycarbonate, etc.). It further can have varying indices of refraction, thicknesses, focal lengths, etc. The diffusive portions 320 can be created using known techniques such as etching, grinding, frosting, chamfering, and/or other methods, and may be applied to different sides and/or areas of the diffusive optical element 170.

The amount of diffusion of light 350 passing through the diffusive optical element 170 can vary, depending on desired functionality. In some embodiments, a diffusive optical element 170 can diffuse only a portion of the light 350, to enable functionality of modified interrogation unit 111 at both short range and long range. For example, in some embodiments, the diffusive optical element 170 can diffuse less than 5%, 10%, 15%, or 20% of the total power produced by the light source 340. In other embodiments requiring less long-range capabilities, the amount of diffusion of the light 350 provided by the diffusive optical element 170 can be much greater.

Diffusive Optical Element

While FIGS. 3A and 3B illustrate embodiments of the present invention employing a diffusive optical element 170 comprising a lens proximate to the light source 340, it will be understood that a diffusive optical element 170 may be added at any of various locations in the optical train of an modified interrogation unit 111 and may be separate from a lens. In embodiments where a laser beam does not need to be collimated by a diffusive optical element 170, the diffusive optical element 170 can exclude the collimating portion 330. For example, A diffusive annulus may be introduced in the optical train after a collimating lens.

The amount of beam divergence provided by the diffusive portions 320 of a diffusive optical element 170 can vary, depending on desired functionality. In weapon-mounted IFF applications, for example, a beam spread of approximately 40 to 60 milliradians can be suitable. Other embodiments can have a larger or smaller beam divergence. Common optical simulation software can be utilized to determine the type and degree of etching, grinding, frosting, chamfering, etc. necessary to provide the desired beam divergence. One such optical simulation program is ZEMAX®, created by Radian ZEMAX LLC, of Belleview, Wash.

A diffusive optical element 170 works on the principal of scattering, which is a general physical process where some forms of radiation, such as light, or moving particles, are forced to deviate from a straight trajectory by one or more localized non-uniformities in the medium through which they pass. In conventional use, this also includes deviation of reflected radiation from the angle predicted by the law of reflection. Reflections that undergo scattering are often called diffuse reflections and unscattered reflections are called specular (mirror-like) reflections. In optics, a diffuser is any device that diffuses or spreads out or scatters light in some manner, to give soft light. Diffuse light can be easily obtained by making light to reflect diffusely from a white surface, while more compact optical diffusers may use translucent objects, and can include ground element diffusers. Ground element diffusers are comprised of high tolerance, quality ground element making them ideal for a variety of industrial applications. For example, a 120-grit or 220-grit sandblast can be used to create diffusive portions 320 on the diffusive optical element 170. Undergoing several orthogonal passes during this sandblast process yields even diffusion across the surface.

Figure 4:
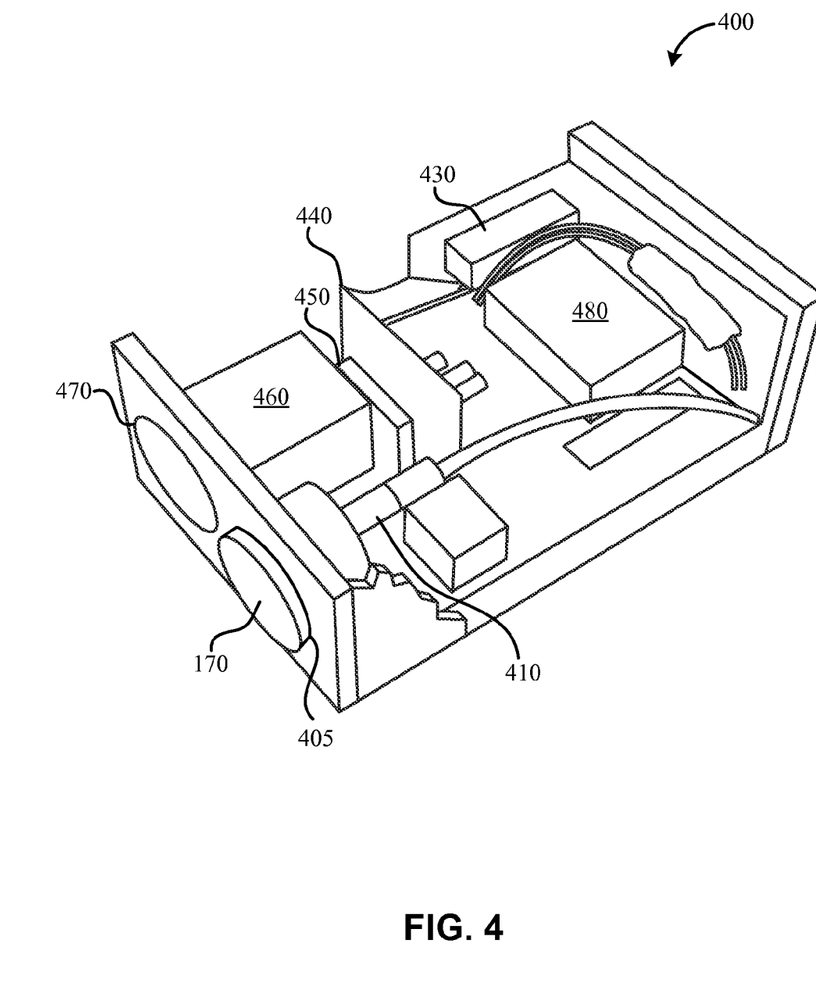
FIG. 4 is a simplified visual representation of a portion of a modified interrogation unit, according to one embodiment.

FIG. 4 is an illustration providing a visual representation of a portion 400 of a modified interrogation unit 111, according to one embodiment. A laser emits optical signals through a collimator 410 which collimates the beam for subsequent transmission through a laser aperture 405, having a diffusive optical element 170. Power is supplied to the unit by battery 480. The system further comprises a high voltage supply 430, an analog board 440, an avalanche photodiode (APD) receiver module 450, a receiver lens and filter assembly 460 and a receiver aperture 470 into which reflected optical signals are received.

Figure 5:
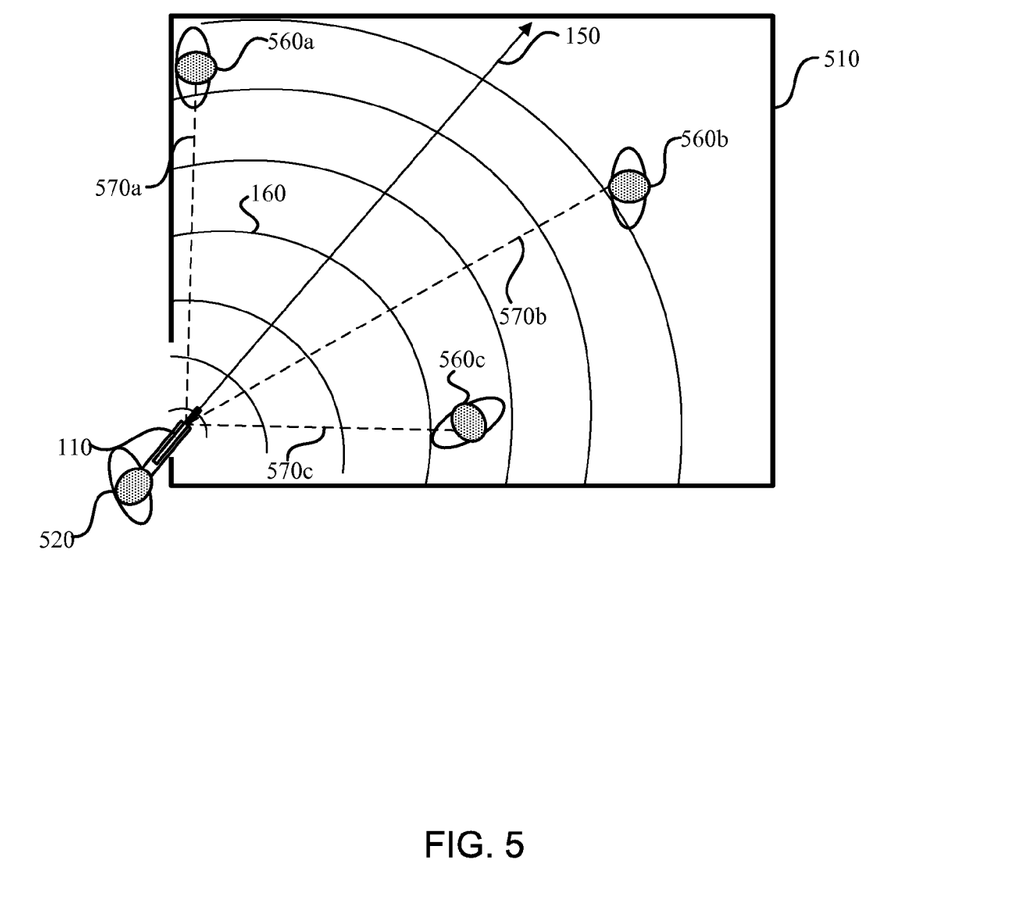
FIG. 5 is overhead view of a simplified illustration showing how diffusive elements and techniques provided herein may be used to provide IFF functionality to an optical communication system in a short-range scenario.

FIG. 5 is an overhead view of a simplified illustration showing how a laser communication system employing the diffusive optical element 170 above may be used to provide IFF functionality in a short-range scenario. In particular, indoors. As will all other figures provided herein, the illustration provided in FIG. 5 is an example, and is not limiting.

In this scenario, a soldier 520 can insert a weapon-mounted modified interrogation unit 111 employing a diffusive optical element 170 before entering a room 510. The soldier 520 then can cause the modified interrogation unit 111 to transmit an interrogation signal comprising diffused and undiffused portions. The diffused portion of the interrogation signal comprises a diffused beam of light 160 that radiates at a wide angle, which can be sufficient to illuminate nearly all portions of the room 510. On the other hand, the undiffused portion of the interrogation signal comprises a laser beam 150 having low beam divergence.

FIG. 5 illustrates the diffused portion of the interrogation signal 540 illuminating 3 targets 560a, 560b, and 560c, each of which has a modified response unit 141 that reflects a response signal 570a, 570b, and 570c back to the modified interrogation unit 111. Response signals 570a, 570b, 570c, may contain identification and/or other information, which can be displayed or otherwise communicated to the soldier 520 to help the soldier 520 determine whether targets 560a, 560b, and 560c may be friendly or hostile.

Optical Detectors

Because the modified interrogation unit 111 can generate an interrogation signal that radiates at a wide range of angles, the modified interrogation unit 111 can be adapted to receive diffused beams of reflected light 165 from wide range of angles. According to some embodiments of the present invention, this may be achieved by utilizing a plurality of optical detectors 130 at the modified interrogation unit 111.

Although detection of a response signal may be accomplished using many methods, such as mirrors and or waveguides to guide any response signals received from multiple angles onto a single optical detector 130, utilizing a plurality of optical detectors 130 allows the modified interrogation unit 111 to process multiple response signals separately, which can have its advantages. For example, not only does maintaining separate response signals allow for easier processing of the signals, but it further enables the system to determine where a given response signal came from based on the position of the receiver that received it. It will be understood that any number of optical detectors 130 may be employed in any number of configurations to receive response signals from a wide range of angles, depending on the desired capabilities and specifications of the system. Moreover, these optical detectors 130 can be less sensitive than optical detectors adapted for long-range use. Less-sensitive optical detectors 130 typically can be obtained at lower costs than the more sensitive optical detectors, reducing the potential costs of the overall system.

Modified Response Units

Response units can create a response signal by modulating data, including transmit and receive codes, onto the interrogation signal by using techniques such as those discussed in U.S. Pat. No. 7,983,565, filed on Dec. 10, 2008, entitled "Integrated Optical Communication and Range Finding System and Application Thereof," which is incorporated in its entirety by reference. For instance, an interrogation signal (communicated via laser beam 150 and/or diffused beam of light 160) can include a frame-synchronization preamble followed by a transmit code, which is further followed by a interrogation pulse stream. In operation, the transmit code can be received by one or more of the plurality of photo detectors of a modified response unit 141, which can produce a response data signal. The response data signal can include a logical combination of selected information from transmit code and local memory. Response data signal can be presented to an obturator driver, which can produce an obturator signal for opening and closing (making translucent and opaque) an obturator in a retroreflector of a modified response unit 141. These modified response unit 141 can therefore send a modulated response signal (via reflected laser light) back to the modified interrogation unit 111 for processing.

Figure 6:
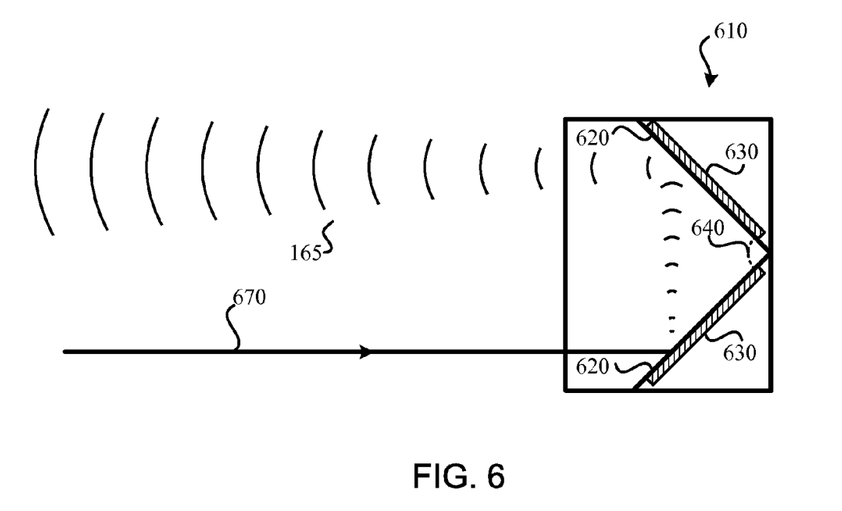
FIG. 6 is a simplified cross-sectional illustration of an embodiment of a modified corner-cube retroreflector.

Referring to FIG. 6, a simplified cross-sectional illustration of a modified corner-cube retroreflector 610 of a modified response unit 141 is shown. The modified response unit 141 can include various other components (not shown) coupled to the modified corner-cube retroreflector 610 that are utilized in conventional optical systems. These other components can include a modulation component, processing unit, memory, etc., which can be configured to modulate the diffused beam of reflected light 165 with data (e.g., identification information, code signals, etc.).

Similar to other corner-cube retroreflectors, the modified corner-cube retroreflector 610 includes three reflective surfaces 620 (two shown) that are mutually orthogonal or approximately orthogonal to enable the modified corner-cube retroreflector 610 to reflect a beam of light 670 in an approximately opposite direction, toward the source of the beam of light 670. Unlike conventional corner-cube retroreflectors, however modified corner-cube retroreflector 610 can include at least one modification to help facilitate short-range optical communication.

A first modification of the modified corner-cube retroreflector 610 can include the use of diffusive regions 630 that cover at least a portion of one or more of the reflective surfaces 620 of the modified corner-cube retroreflector 610. In a manner similar to the diffusive portions 320 of the diffusive optical element 170 of the modified interrogation unit 111, these diffusive regions 630 can increase beam divergence of the incoming beam of light 670 to create a diffused beam of reflected light 165 that can facilitate detection of the modified response unit 141. In many embodiments, beam divergence of 1 to 2 milliradians is sufficient for short-range applications, although the modified corner-cube retroreflector 610 can be configured to cause a beam divergence of greater than 2 milliradians or less than 1 milliradian, depending on desired functionality.

The diffusive regions 630 modified corner-cube retroreflector 610 can be created using various techniques such as etching, grinding, frosting, etc. to roughen reflective surfaces 620 to cause the desired diffusion. For example, a 120-grit or 220-grit sandblast can be used to create a diffuse surface on the optical element. Common optical simulation software can be used to determine the degree roughness required to result in the desired beam divergence.

A second modification of the modified corner-cube retroreflector 610 can include altering an angle 640 between at least two of the reflective surfaces 620. Put another way, an angle 640 between at least two of the reflective surfaces 620, which are approximately orthogonal to each other, can be greater or less than 90 degrees. Such an alteration in the angle 640 can help overcome the issues concerning detecting the modified response unit 141 resulting from the beam of light 670 being reflected too precisely back to the laser transmitter 120 of the modified interrogation unit 111, as discussed earlier.

Figure 7:
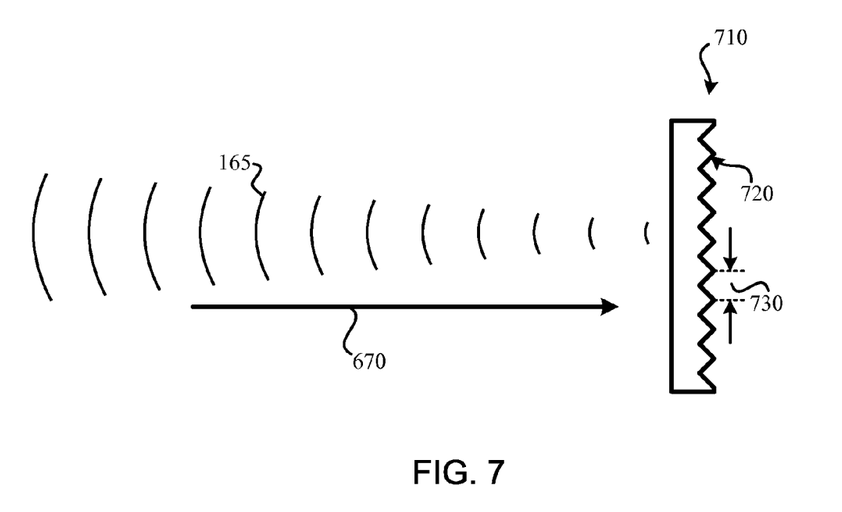
FIG. 7 is a simplified cross-sectional illustration of an embodiment of a planar retroreflector.

FIG. 7 illustrates a simplified cross-sectional illustration of a planar retroreflector 710. Similar to the modified corner-cube retroreflector 610, the planar retroreflector 710 can cause an increase beam divergence of the incoming beam of light 670 to create a diffused beam of reflected light 165 that can facilitate detection of the modified response unit 141. Rather than a single set of reflective surfaces 620 of a conventional corner-cube retroreflector, however, the planar retroreflector 710 can include multiple sets of reflective surfaces 720, with much smaller features than a conventional corner-cube retroreflector, allowing the planar retroreflector 710 to be substantially thinner than a conventional corner-cube retroreflector.

Because the sets of reflective surfaces 720 can include defects and/or because the incoming beam of light 670 can illuminate a plurality of sets, the planar retroreflector 710 can create a diffused beam of reflected light 165 with sufficient beam divergence for many short-range optical applications discussed herein. In one embodiment, for example, a planar retroreflector 710 manufactured from optical-grade silicon can provide a beam divergence of 1 to 2 milliradians.

The size of the reflective surfaces 720 of the planar retroreflector 710 can vary. According to some embodiments, for example, a width 730 of a set of reflective surfaces 720 can be 100 to 500 microns. Other embodiments can include a width of greater than 500 microns or less than 100 microns, depending on manufacturing concerns and/or desired functionality. However, features smaller than 100 microns can begin to display diffractive effects, which can be undesirable in many applications.

The planar retroreflector 710 can be made with many common optical materials, such as glass, resin plastics, polyester, polycarbonate, etc. Optical-grade silicon also can be used, in which case reflective surfaces 720 can be formed using common silicon lithographic and etching techniques.

Circuits, logic modules, processors, and/or other components may be described herein as being "configured" to perform various operations. Those skilled in the art will recognize that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Computer programs incorporating various features of the present invention may be encoded on various computer readable storage media; suitable media include magnetic media, optical media, flash memory, and the like. Computer-readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download.

While the principles of the disclosure have been described above in connection with specific apparatuses and methods, it is to be clearly understood that this description is made only by way of example and not as limitation on the scope of the disclosure. Additional implementations and embodiments are contemplated. For example, the techniques described herein can be applied to various forms of free-space optical communication other than IFF systems, and can communicate information such as personal information, credit card information, text, audio, video, etc., which can be encrypted. Yet further implementations can fall under the spirit and scope of this disclosure.

What is claimed is:

1. A method of free-space optical communication using laser light, the method comprising:
   generating a beam of light with a laser at a first location;
   modulating the beam of light with a first data signal to provide an optical transmission signal;
   diffusing a first portion of the optical transmission signal with an optical element to cause an increase in beam divergence of the first portion of the optical transmission signal;
   receiving at least a portion of the optical transmission signal at a second location;
   reflecting the optical transmission signal to provide a reflected optical transmission signal;
   modulating the reflected optical transmission signal;
   diffusing at least a portion of the reflected optical transmission signal to cause an increase in beam divergence of the at least the portion of the reflected optical transmission signal; and
   providing a plurality of sensors configured to detect the reflected optical transmission signal from one or more of a plurality of angles.

2. The method of free-space optical communication using the laser light recited in claim 1, further comprising collimating a second portion of the optical transmission signal with the optical element.

3. The method of free-space optical communication using the laser light recited in claim 1, wherein the beam divergence of the first portion of the optical transmission signal, after being diffused with the optical element, is at least 40 milliradians (mrad).

4. The method of free-space optical communication using the laser light recited in claim 1, wherein the beam divergence of the at least the portion of the reflected optical transmission signal, after being diffused, is at least 1 mrad.

5. The method of free-space optical communication using the laser light recited in claim 1, wherein the first portion of the optical transmission signal comprises 15% or less of the total power of the optical transmission signal.

6. The method of free-space optical communication using the laser light recited in claim 1, wherein the reflecting the optical transmission signal includes using a plurality of retroreflective features, each of the retroreflective features having a set of three reflective surfaces that are approximately orthogonal to each other.

7. The method of free-space optical communication using the laser light recited in claim 1, further comprising:
   determining, at the first location, that a signal received from a sensor of the plurality of sensors representing the reflected optical transmission signal is below a threshold level, and
   increasing power of the beam of light.

8. The method of free-space optical communication using the laser light recited in claim 1, wherein the plurality of sensors comprise avalanche photo diodes.

9. A free-space optical interrogator comprising:
   a laser configured to generate a beam of light;
   a modulation component coupled with the laser and configured to modulate the beam of light with a first data signal to provide an optical transmission signal;
   an optical element disposed in a path of the optical transmission signal, wherein:
      a first portion of the optical element is configured to diffuse a first portion of the optical transmission signal; and
      wherein a second portion of the optical element is configured to collimate a second portion of the optical transmission signal;
   a plurality of sensors configured to receive a reflected optical transmission signal from one or more of a plurality of angles; and
   a demodulation component coupled with the one or more sensors and configured to determine second data signal from the reflected optical transmission signal, wherein the second data signal is different from the first data signal.

10. The free-space optical interrogator recited in claim 9, wherein the first portion of the optical element is configured to cause beam divergence of the first portion of the optical transmission signal of at least 40 milliradians (mrad).

11. The free-space optical interrogator recited in claim 9, wherein the optical element is configured to diffuse 15% or toss of the total power of the optical transmission signal.

12. The free-space optical interrogator recited in claim 9, further comprising a feedback component communicatively coupled with the sensors and configured to increase power of the beam of light if a detection signal representing the reflected optical transmission signal is below a threshold level.

\* \* \* \* \*

UNITED STATES PATENT AND TRADEMARK OFFICE
CERTIFICATE OF CORRECTION

PATENT NO. : 8,831,429 B2  
APPLICATION NO. : 13/186148  
DATED : September 9, 2014  
INVENTOR(S) : Tony Maryfield et al.

Page 1 of 1

It is certified that error appears in the above-identified patent and that said Letters Patent is hereby corrected as shown below:

In the Claims:

Column 11, line 9, please delete "level," and insert --level;--.
Column 12, line 8, please insert --a-- between "determine" and "second".
Column 12, line 18, please delete "loss" and insert --less--.

Signed and Sealed this
Seventeenth Day of March, 2015

Michelle K. Lee
*Director of the United States Patent and Trademark Office*